(12) United States Patent
Asakawa

(10) Patent No.: US 6,950,666 B2
(45) Date of Patent: Sep. 27, 2005

(54) WIRELESS MOBILE DEVICE NETWORK

(75) Inventor: Stuart D Asakawa, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 576 days.

(21) Appl. No.: 09/930,039

(22) Filed: Aug. 14, 2001

(65) Prior Publication Data
US 2003/0036398 A1 Feb. 20, 2003

(51) Int. Cl.[7] .................. H04B 15/00; H04B 7/005; H04B 7/01; H04B 7/015
(52) U.S. Cl. .............. 455/503; 455/556; 455/11.1; 455/41.2; 455/518; 455/416; 455/414.1; 455/422.1; 370/338
(58) Field of Search ................. 455/503, 556, 455/500, 502, 11.1, 41.2, 445, 518, 519, 415, 416, 414.1, 422.1, 426.1, 556.1; 370/338

(56) References Cited

U.S. PATENT DOCUMENTS 6,026,297 A * 2/2000 Haartsen .................. 455/426.1
6,252,884 B1   6/2001 Hunter
2001/0055988 A1  12/2001 Blake et al.
2002/0061009 A1 * 5/2002 Sorensen .................. 370/351
2002/0075940 A1 * 6/2002 Haartsen .................. 375/132
2002/0142721 A1 * 10/2002 Souissi et al. ............ 455/41

FOREIGN PATENT DOCUMENTS

| EP | 0695059 A1 | 1/1996 |
| GB | 2360914 A | 10/2001 |
| WO | WO0069186 A1 | 11/2000 |
| WO | WO0205435 A2 | 1/2002 |

* cited by examiner

Primary Examiner—Nick Corsaro
Assistant Examiner—Shaima Q. Aminzay

(57) ABSTRACT

To form a wireless network, a network invitation signal is broadcast to potential members of the wireless network that are within a range of the wireless network. Upon a potential member of the wireless network responding affirmatively to join the wireless network, identification information is obtained from the potential member. The potential member is then included within the wireless network.

10 Claims, 5 Drawing Sheets

FEATURED ITEMS

_____
_____
_____
_____
_____
_____
_____
_____
_____
_____
 50

ENTER LOGIN INFORMATION:

LOGIN NAME:_____
ZIP CODE: _____
E-MAIL ADDRESS:_____

WIRELESS MOBILE DEVICE NETWORK

BACKGROUND OF THE INVENTION

The present invention pertains to networking of computing systems and pertains particularly to a wireless mobile device network.

Wireless networks connecting computer devices are gaining increasing acceptability as an efficient means to communicate between computers. Wireless networks allow for interconnection of computing devices without hardware interconnection.

Existing network methodologies typically presume that networks are somewhat static. Local area wireless networks, such as the AirPort wireless network available from Apple Corporation, require significant set up and configuration effort. Typically such a set-up includes, survey of a wireless site, verification of internet connections and an electrical outlet for a base station, an initial system and network configuration, installation of special cards in existing computers, installation of special networking software, and verification of network operation.

SUMMARY OF THE INVENTION

In accordance with the preferred embodiment of the present invention, a wireless network is formed. A network invitation signal is broadcast to potential members of the wireless network that are within a range of the wireless network. Upon a potential member of the wireless network responding affirmatively to join the wireless network, identification information is obtained from the potential member. The potential member is then included within the wireless network.

BRIEF DESCRIPTION OF THE DRAWINGS

FIG. 3, FIG. 4, and FIG. 5 illustrate information exhibited on a network device display during formation and use of a wireless mobile device network in accordance with a preferred embodiment of the present invention.

DETAILED DESCRIPTION OF THE PREFERRED EMBODIMENT

The present invention provides a methodology whereby wireless mobile devices can discover each other and form a local network. The networks are, for example, temporary networks where individual devices are dynamically added or dropped based on proximity and/or desire by users to be part of the any particular network. The networks allow for exchange, broadcast and generation of information.

The present invention allows users to connect into local networks without knowing a web address. Devices within a range within which the network is active are invited to join a network. If the user of a device accepts an invitation to join a network, the device is added to the network. The device stays a part of the network until the device leaves the range within which the network is active or the user of the device logs off the network, for example by selecting a log off option or turning off the power of the device. In preferred embodiments of the present invention, multiple networks can exist within the same range. A single device can simultaneously be part of more than one network.

Figure 1:
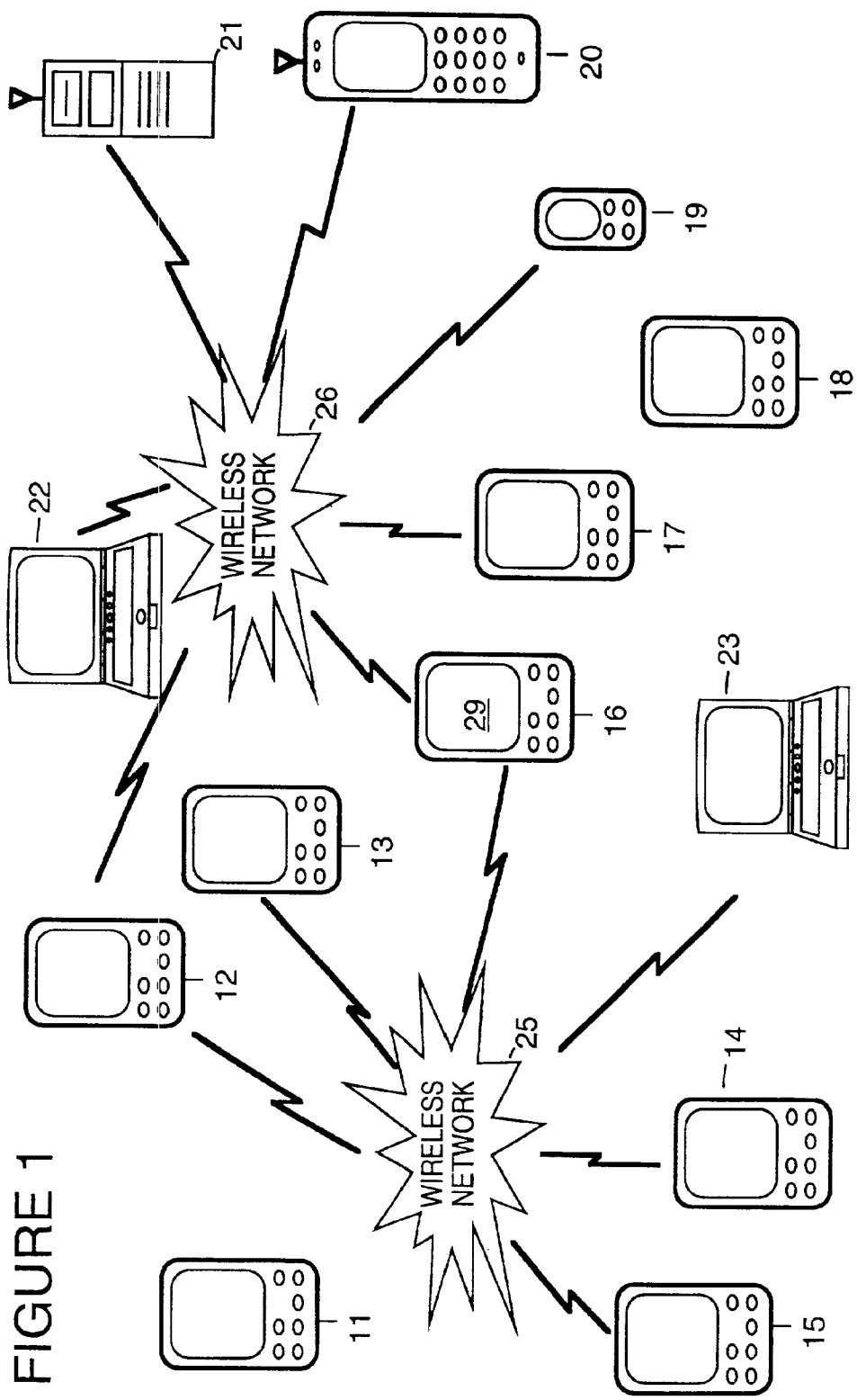
FIG. 1 is a simplified block diagram illustrating formed wireless mobile device networks in accordance with a preferred embodiment of the present invention.

FIG. 1 is a simplified block diagram illustrating formed wireless mobile device networks. Joined together in a wireless network 25 are a device 12, a device 13, a device 14, a device 15 a device 16 and a device 23. Joined together in a network 26 are device 12, device 16, a device 17, a device 19, a device 20, a device 21, and a device 22. Device 11 and device 18 are both within a range within which wireless network 25 and wireless network 26 are active, but neither device 11 nor device 18 have joined either wireless network 25 or wireless network 26.

Devices 11 through 23 are a variety of computing devices or computing capable systems with wireless communication capability. For example, devices 11 through 18 are personal digital assistants (PDAs). Device 19 is a pager. Device 20 is a cellular phone. Device 21 is a desktop computer. Devices 22 and 23 are notebook computers. Other types of computing capable system with wireless communication capability can also be connected together in wireless networks. For example, pagers, organizers, or any other device with computing capability can be used to join together in wireless network 25 and/or wireless network 26.

Figure 2:
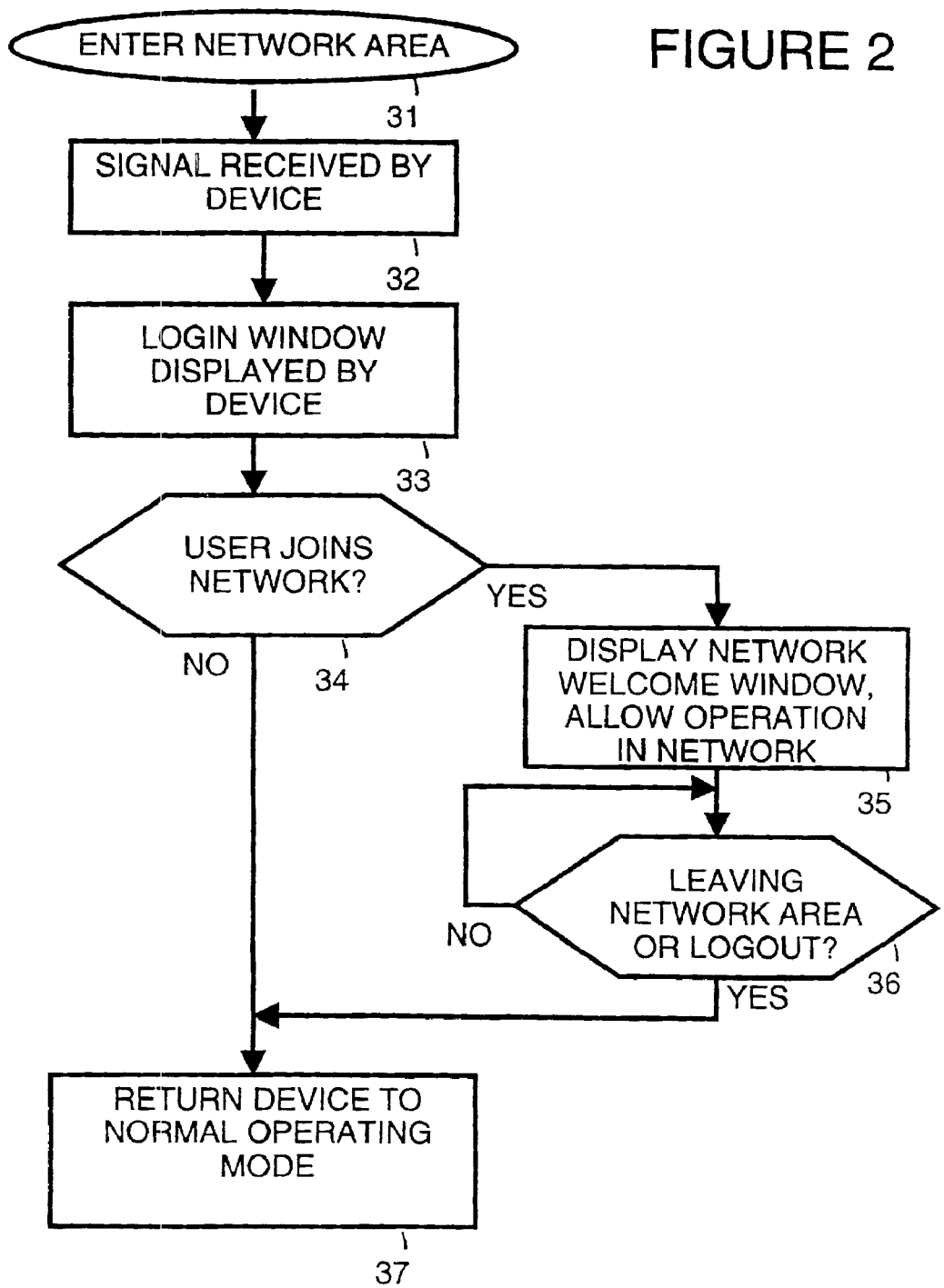
FIG. 2 is a flowchart illustrating the formation of wireless mobile device networks in accordance with a preferred embodiment of the present invention.

FIG. 2 is a flowchart illustrating the operation of software within each device that facilitates joining a wireless network. In a step 31, the device enters a range within which a wireless network is active. In a step 32 a network invitation broadcast signal is received by the device. The network invitation broadcast signal is a continuous signal sent whenever a wireless network is active and accepting additional devices.

In a step 33, a login window is displayed on the device. The login window invites the user of the device to join the network and gives the user the option to join. Additional information may be displayed as well, depending upon the network.

For example, wireless network 26 is a network operating within a store. Upon a user carrying device 16 into the store, a login window is placed on a display 29 of device 16. This is illustrated by FIG. 3.

Figure 3:
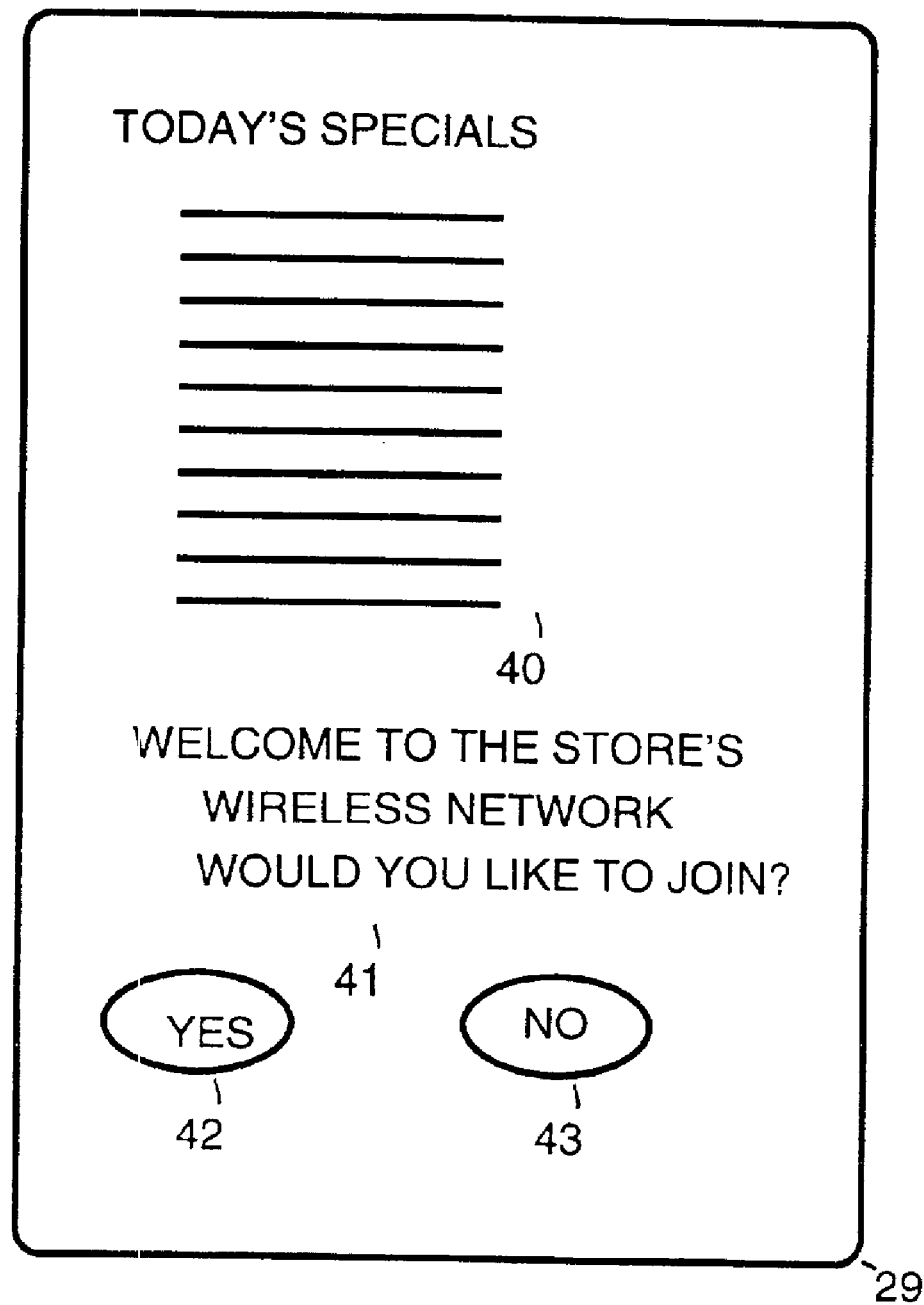

In FIG. 3, a message 41 on display 29 of device 16 identifies wireless network 26. A user can use a YES button 42 or a NO button 43 to respond to the invitation to join the wireless network. An area 40 sets out advertising information displayed along with message 41.

As shown by FIG. 2, in a step 34, if a user joins the network, in a step 35, a network welcome screen appears. The welcome screen, for example, requests identification information from the user of the device. Additional information may be displayed as well, depending upon the network. This is illustrated by FIG. 4.

In FIG. 4, a request for identification information 51 is shown on display 29 of device 16. The requested information can be supplied by the user of device 16 or filled in automatically by device 16. The information requested by a network varies from network to network. An area 50 sets out additional information displayed along with request for identification information 51.

Once the device supplies identification information the device is allowed full access to the network. This is illustrated by FIG. 5.

Figure 5:
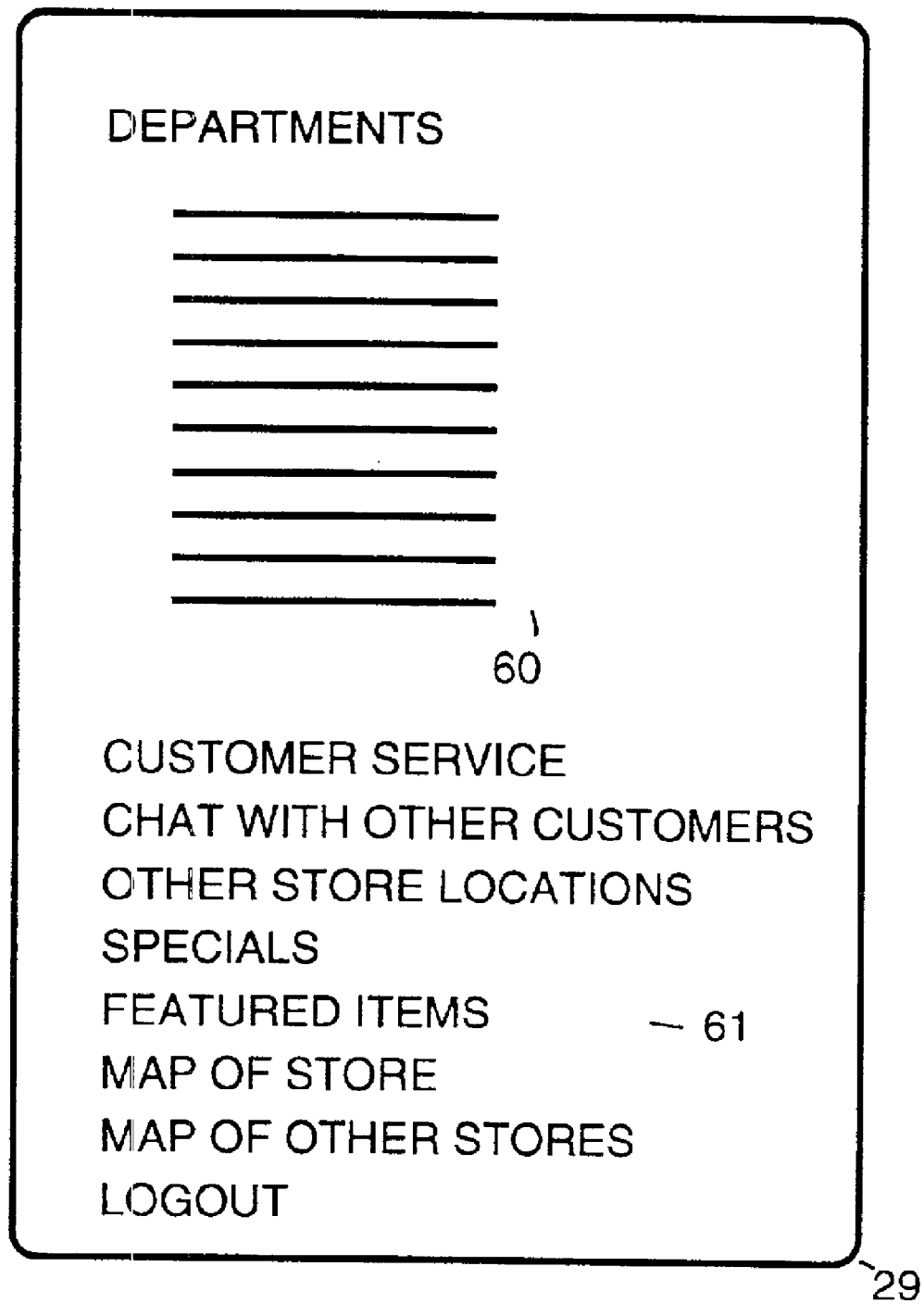

In FIG. 5, a list of departments is shown in an area 60 of display 29 of device 16. A user can select on any department for department specific information. In an area 61 of display 29 of device 16, a user is given additional options. Selecting one of these options will allow a user to, for example, access customer service, chat with other customers, find other store locations, learn about specials, learn about featured items, access a map of the store, and/or access a map showing the location of other stores. A user is also given the option to log out. Information available via wireless network 26 includes, for example, daily discounts, aisle locator of goods, product data sheets, tips, information on inventory, e-mail messaging and so on.

As shown by FIG. 2, in a step 36 a user can exit a network by leaving the range within which the network is active or by logging out. In some networks a warning range is instituted that lets a user know that the user's device is in the outer fringes of a network range and the user is thus about to be logged off the network. Turning off the power to device 16 also causes device 16 to leave the network. As illustrated by a step 37, when a device is not active in the network the device operates in a normal operating mode.

The sophistication of each network depends upon the organizing device. For example, wireless network 26 is organized by a device 21 which operates as a network server within the store. Since wireless network 26 is meant to be a semi-permanent network, wireless network 26 can make available a large amount of information to shoppers who enter the store and subsequently log on to wireless network 26. Wireless network 26 is illustrative of wireless networks that can exist in an unlimited number of locations. For example, such wireless networks can reside in sports stadiums, sports pavilions, museums, tourist sites, universities, schools, apartment complexes, homes, manufacturing locations, research sites and so on. Information available from a network within a sports arena includes, for example, sports scores from other sporting events, player statistics, player history, player pictures, team statistics, team pictures, opportunity to purchase merchandise, access to instant replay, maps of the sports arena including seat locations and vendor booths, schedule of future events, and so on.

Wireless network 25, however, is an impromptu network a customer initiated while shopping in the store. Device 15 initiated the network by broadcasting a network invitation broadcast signal. Once another device responded by logging in, wireless network 25 began. Wireless network 25 allows shoppers to communicate while they are within a close proximity of each other. Even when device 15 leaves wireless network 25, wireless network 25 remains alive as long as there are at least two devices within wireless network 25. Impromptu wireless networks can be initiated by any user at any location provided other devices are willing to join the network.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for forming a wireless network comprising:
    (a) broadcasting a network invitation signal to a potential member of the wireless network that are within a range of the wireless network;
    (b) upon a potential member of the wireless network responding affirmatively to join the wireless network, performing the following:
        (b.1) obtaining identification information from the potential member, and
        (b.2) including the potential member within the wireless network; and,
    (c) upon the potential member selecting to log out of the wireless network, excluding the potential member from the wireless network.

2. A method as in claim 1 additionally comprising the following:
    (d) upon a second potential member of the wireless network responding negatively to join the wireless network, excluding the second potential member from the wireless network.

3. A method as in claim 1 wherein in step (a) potential members of the wireless network include users with one of the following devices:
    a personal digital assistant;
    a notebook computer;
    a cellular phone;
    a pager.

4. A method as in claim 1 wherein in step (a) the range of the wireless network includes one of the following:
    a store site;
    a sports stadium;
    a sports pavilion;
    a museum;
    a tourist site;
    a university;
    a school;
    an apartment complex;
    a home;
    a manufacturing location;
    a research site.

5. A method by which a potential member interacts with a wireless network, the method comprising the following:
    (a) upon the potential member receiving a broadcast network invitation signal to join the wireless network, performing the following substeps by the potential member:
        (a.1) when the potential member wishes to join the wireless network, performing the following:
            responding affirmatively to the broadcast network invitation signal to join the wireless network, and
            providing identification information to the wireless network in response to a request for the identification information, and
        (a.2) when the potential member does not wish to join the wireless network, performing the following:
            responding negatively to the broadcast network invitation signal to join the wireless network; and
    (b) upon the potential member selecting to log out of the wireless network, exiting the potential member from the wireless network.

6. A method as in claim 5 wherein the potential member is a user with one of the following devices:
    a personal digital assistant;
    a notebook computer;
    a cellular phone;
    a pager.

7. A method as in claim 5 wherein a range of the wireless network includes one of the following:
    a store site;
    a sports stadium;

a sports pavilion;

a museum;

a tourist site;

a university;

a school;

an apartment complex;

a home;

a manufacturing location;

a research site.

8. Storage media which when executed on a computing device performs a method by which a potential member interacts with a wireless network, the method comprising the following:
   - (a) upon the potential member receiving a broadcast network invitation signal to join the wireless network, performing the following by the potential member:
     - (a.1) when the potential member wishes to join the wireless network, performing the following:
       - responding affirmatively to the broadcast network invitation signal to join the wireless network, and providing identification information to the wireless network in response to a request for the identification information; and,
     - (a.2) when the potential member does not wish to join the wireless network, performing the following:
       - responding negatively to the broadcast network invitation signal to join the wireless network; and
   - (b) upon the potential member selecting to log out of the wireless network, exiting the potential member from the wireless network.

9. Storage media as in claim 8 wherein the computing device is one of the following:

a personal digital assistant;

a notebook computer;

a cellular phone;

a pager.

10. Storage media as in claim 8 wherein a range of the wireless network includes one of the following:

a store site;

a sports stadium;

a sports pavilion;

a museum;

a tourist site;

a university;

a school;

an apartment complex;

a home;

a manufacturing location;

a research site.

* * * * *